March 31, 1964    R. W. HOWARD ETAL    3,126,736
AIRCRAFT INSTRUMENT SYSTEMS
Filed Feb. 9, 1962
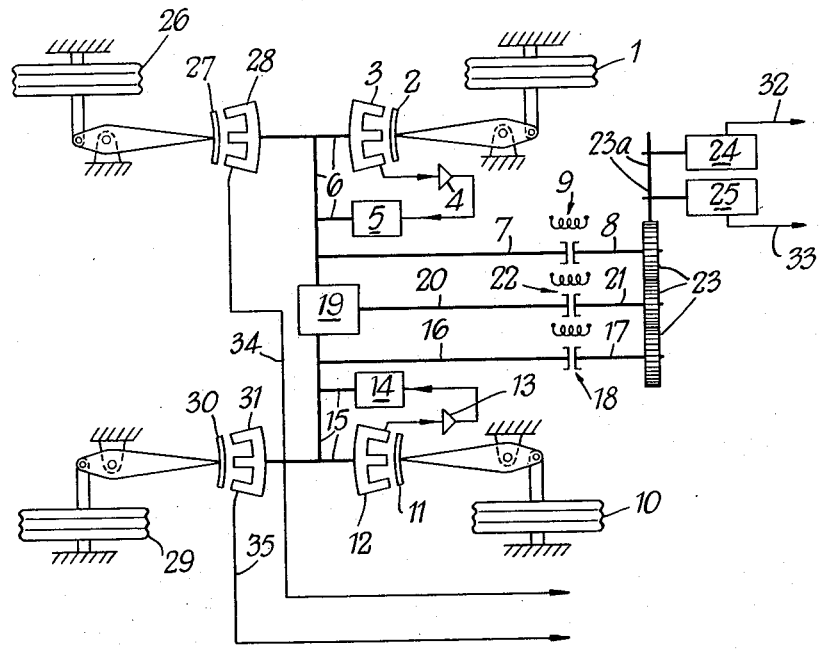
INVENTors
Ronald Walter Howard
Richard Kenneth Barltrop
By
Bailey, Stephens & Huettig
ATTORNEYS 3,126,736
AIRCRAFT INSTRUMENT SYSTEMS
Ronald Walter Howard and Richard Kenneth Barltrop,
Radlett, England, assignors to Elliott Brothers (London)
Limited, London, England, a company of Great Britain
Filed Feb. 9, 1962, Ser. No. 172,135
Claims priority, application Great Britain Feb. 10, 1961
6 Claims. (Cl. 73—178)

This invention relates to aircraft instrument systems.

Electrical signals proportional to functions of barometric height, indicated air speed and Mach number are required to be supplied to aircraft automatic flight control systems and the means for generating such signals is referred to as an "air data sensor." The air data sensor comprises a manometric capsule adapted to respond to variations in the static pressure and therefore to sense the barometric height, a manometric capsule adapted to respond to variations in the Pitot-static pressure and therefore to sense the indicated air speed and means adapted to produce an output which is representative of the ratio between the Pitot-static pressure and the static pressure and therefore corresponds to the Mach number. Electrical signals can be derived from the movements of the manometric capsules and from the means referred to with the aid of electrical pick-off devices of various known types.

In the case of aircraft required to perform automatic landings, "vertical take-off" aircraft or aircraft required to travel at supersonic speeds, it is desirable for safety reasons to provide duplicate flight control systems which will operate simultaneously and in unison. Although each system could comprise its own air data sensor and other individual items of equipment, this duplication would add impermissably to the weight of the complete dual system and considerably increase the servicing and maintenance costs. So far as the air data sensor is concerned, we have found that entirely satisfactory results from the safety point of view can be achieved if this can be arranged to deliver dual outputs, one for use in each flight control system, provided that the pressure-responsive devices producing the outputs are monitored so that an error in the functioning of either one of them can be detected and utilised for disconnecting the system or systems in use from the aircraft controls.

The present invention has for its main object to provide an improved monitored air data sensor adapted to produce dual outputs representative of barometric height, indicated air speed and Mach number suitable for use in a dual flight control system, which air data sensor will be lighter in weight and less complex than those heretofore available.

One embodiment of the invention will now be described by way of example, reference being made to the accompanying drawing which is a diagrammatic illustration of a monitored air data sensor according to the invention.

In the arrangement illustrated, the air data sensor comprises a static pressure capsule 1 the movements of which are arranged to cause corresponding displacements of an armature 2 relative to a core 3 carrying appropriate windings (these two parts constituting a transducer) so that an electrical output will be produced which is representative of the magnitude and direction of the movement executed by the armature 2. This output is supplied through an amplifier 4 to a motor 5 which is arranged to drive the core 3, by way of a drive 6, relative to the armature 2 in the sense for reducing the magnitude of the output. Also driven from this motor 5 is a first shaft 7 the angular setting of which is thus representative of a function of the barometric height sensed by the static pressure capsule. A further shaft 8 is adapted to be coupled to the shaft 7 by way of an electromagnetic clutch 9.

There is also a Pitot-static pressure capsule 10 with an associated servo follow-up unit similar to that associated with the static pressure capsule 1 and comprising an armature 11, a core 12 (these two parts constituting a transducer), an amplifier 13 and a motor 14 mechanically coupled to the core 12 by a drive 15. The motor 14 of this unit drives a second shaft 16 disposed parallel with the first shaft 7 and the angular setting of the second shaft 16 is representative of a function of the indicated air speed sensed by the Pitot-static pressure capsule 10. A further shaft 17 is adapted to be coupled to the second shaft 16 by way of an electromagnetic clutch 18.

The first and second shafts 7 and 16 are mechanically coupled to a mechanical differential 19 in such manner that the angular setting of a third shaft 20, constituting the output shaft of this unit, will represent the difference between the functions of the Pitot-static and static pressures. These being logarithmic functions, because capsules 1 and 10 are designed to produce displacements proportional to the logarithms of the pressures, the setting of the third shaft 20 will represent the value of a function of the ratio between the Pitot-static pressure and the static pressure and thus of a function of the Mach number. This third shaft 20 is disposed parallel with and between the first and second shafts 7 and 16 and a further shaft 21 is adapted to be coupled to the third shaft 20 by way of an electromagnetic clutch 22. The three further shafts 8, 17 and 21 are respectively disposed in axial alignment with the associated shafts 7, 16 and 20. The three further shafts 8, 17 and 21 are interconnected by gearing 23 so that they will all rotate upon the driving of any one of them and this gearing 23 is arranged to drive (through further gearing 23a) two electrical pick-off devices 24 and 25 each producing an electrical output signal, these signals being isolated from each other and supplied, respectively, along lines 32 and 33 to the computer and the comparison computer of the aircraft automatic flight control system in which the air data sensor is embodied.

Disposed near to the static pressure capsule 1 is a duplicate or monitoring static pressure capsule 26 the movements of which are arranged to cause corresponding displacements of an armature 27 relative to a core 28 carrying appropriate windings (these two parts constituting a transducer) so that an electrical signal will be produced along line 34 which is representative of the magnitude and direction of the movement executed by the armature 27. The core 28 is mechanically coupled to the motor 5 driving the first shaft 7 so that it will be driven relative to its armature 27 in the sense which would normally (that is, when armature 27 moved by the monitoring capsule is receiving a displacement like that of armature 2) reduce the magnitude of the signal, but only to the extent that the rotation of the motor warrants.

A duplicate or monitoring Pitot-static pressure capsule 29 is disposed near to the Pitot-static pressure capsule 10 and the movements of this capsule 29 are arranged to cause corresponding displacements of an armature 30 relative to a core 31 carrying appropriate windings (these two parts constituting a transducer) so that an electrical signal will be produced along line 35 which is representative of the magnitude and direction of the movement executed by the armature 30. This core 31 is mechanically coupled to the motor 14 driving the second shaft 16 so that it will be driven relative to its armature 30 in the sense which would normally (that is, when armatures 11 and 30 are being displaced alike) reduce the magnitude of the signal but, again, only to the extent that the rotation of the motor warrants.

Only one of the three clutches 9, 18 and 22 is intended to be rendered operative at any one time and it will be seen that the clutching of the appropriate one of the three shafts 7, 16 and 20 to its associated further shaft will cause dual electrical output signals to be delivered by the pick-off devices 24 and 25 which are representative of the barometric height, indicated air speed or Mach number, as the case may be. Moreover, should the functioning of a pressure capsule 1 or 10 and of its associated monitoring capsule 26 or 29 differ to a significant degree, the respective signal delivered along line 34 or 35 from the winding on the core 28 or 31 associated with the corresponding monitoring capsule 26 or 29 will represent the error and can be utilised to operate disconnecting means whereby the automatic flight control system is disengaged from the aircraft controls. It is preferred to arrange that correct functioning of a capsule and its monitoring capsule will result in a constant electrical signal along line 34 or 35 so that both no signal and a wrong signal will operate the disconnecting means.

The arrangement described has the advantage that the four pressure capsules together with their associated electromechanical units can all be identical.

What I claim is:

1. A monitored air data sensor comprising a static pressure capsule, means associated with this capsule for angularly positioning a first shaft in accordance with the value of a function of the barometric height sensed by the capsule, a Pitot-static capsule, means associated with this capsule for angularly positioning a second shaft in accordance with the value of a function of the indicated air speed sensed by the capsule, mechanical means interconnecting the first and second shafts with a third shaft in such manner that the angular position of the third shaft will be representative of the value of a function of the Mach number and means whereby each of the three shafts may be selectively coupled to a pair of electrical pick-off devices to operate these in unison and produce respective electrical signals which are isolated from each other characterised by the provision of a monitoring static pressure capsule, first transducer means adapted to be actuated by this monitoring capsule to produce a first electrical signal proportional to the movement of the capsule, means operated mechanically from the means for positioning the first shaft and adapted to actuate the first transducer means in the sense normally for reducing this signal proportionally to the angular displacement of this shaft, a monitoring Pitot-static pressure capsule, second transducer means adapted to be actuated by this monitoring capsule to produce a second electrical signal proportional to the movement of this capsule, and means operated mechanically from the means for positioning the second shaft and adapted to actuate the second transducer means in the sense normally for reducing the second signal proportionally to the angular displacement of the second shaft whereby the first and second signals become representative of the differences in the functioning of the static capsule and monitoring static capsule and of the Pitot-static capsule and monitoring Pitot-static capsule, respectively.

2. An air data sensor according to claim 1 wherein the first shaft positioning means comprises third transducer means adapted to be actuated by the static pressure capsule to produce a third electric signal proportional to the movement thereof and a first electric motor responsive to the third signal to position said first shaft and to actuate the third transducer means in the sense to reduce the third signal proportionally to the angular displacement of the first shaft, and wherein the second shaft positioning means comprises fourth transducer means adapted to be actuated by the Pitot-static capsule to produce a fourth electric signal proportional to the movement thereof and a second electric motor responsive to the fourth signal to position said second shaft and to actuate the fourth transducer means in the sense to reduce the fourth signal proportionally to the angular displacement of the second shaft.

3. An air data sensor according to claim 2 wherein each transducer means comprises a pair of relatively displaceable members and the electric signal produced thereby is proportional to the relative displacement of such members, each one member of a pair of members being displaceable by the associated capsule, the other members of the pair of members of the first and third transducer means being displaceable with the first shaft under the control of the first motor and the other members of the pair of members of the second and fourth transducer means being displaceable with the second shaft.

4. An air data sensor according to claim 1, wherein the means for selectively coupling each of the first, second and third shafts to the pick-off devices comprises first, second and third further shafts connected to said pick-off devices and respectively associated with said first, second and third shafts and clutch means interposed between each of said first, second and third shafts and the associated further shaft.

5. An air data sensor according to claim 4 wherein the clutch means is electro-magnetically operable drivingly to connect each of said first, second and third shafts to the associated further shaft.

6. An air data sensor according to claim 4 wherein said three further shafts are inter-connected by gearing.

No references cited.